United States Patent [19]

Bowman

[11] Patent Number: 4,823,055

[45] Date of Patent: Apr. 18, 1989

[54] ELECTRONIC CONTROL CIRCUIT FOR COMMAND SYSTEMS

[75] Inventor: Richard G. Bowman, Big Bear Lake, Calif.

[73] Assignee: SuperDrive Systems, Inc., Kansas City, Mo.

[21] Appl. No.: 136,204

[22] Filed: Dec. 21, 1987

[51] Int. Cl.$^4$ ............................................. H02P 5/16
[52] U.S. Cl. ..................................... 318/314; 318/318
[58] Field of Search ............... 318/314, 318, 341, 326, 318/327

[56] References Cited

U.S. PATENT DOCUMENTS 3,340,951  9/1967  Vitt ..................................... 318/314
4,360,767  11/1982 Akiyama et al. ..................... 318/314
4,680,516  7/1987  Guzik et al. ......................... 318/314

Primary Examiner—David Smith, Jr.
Attorney, Agent, or Firm—Kokjer, Kircher, Bradley, Wharton, Bowman & Johnson

[57] ABSTRACT

A control circuit for a closed loop command system having an output which is adjusted to conform with an input command level. A pulse generator provides digital pulses with durations representative of the output of the system. Command pulses are generated by the system pulses and have durations representative of the input command. Each pulse is applied to logic gating along with the complement of the other pulse, with the logic gating providing a signal indicating whether the system pulse or the command pulse is longer. The last gate signal is retained in a flip flop memory and is used to adjust the output power level up or down depending upon the result of the pulse length comparison.

3 Claims, 3 Drawing Sheets

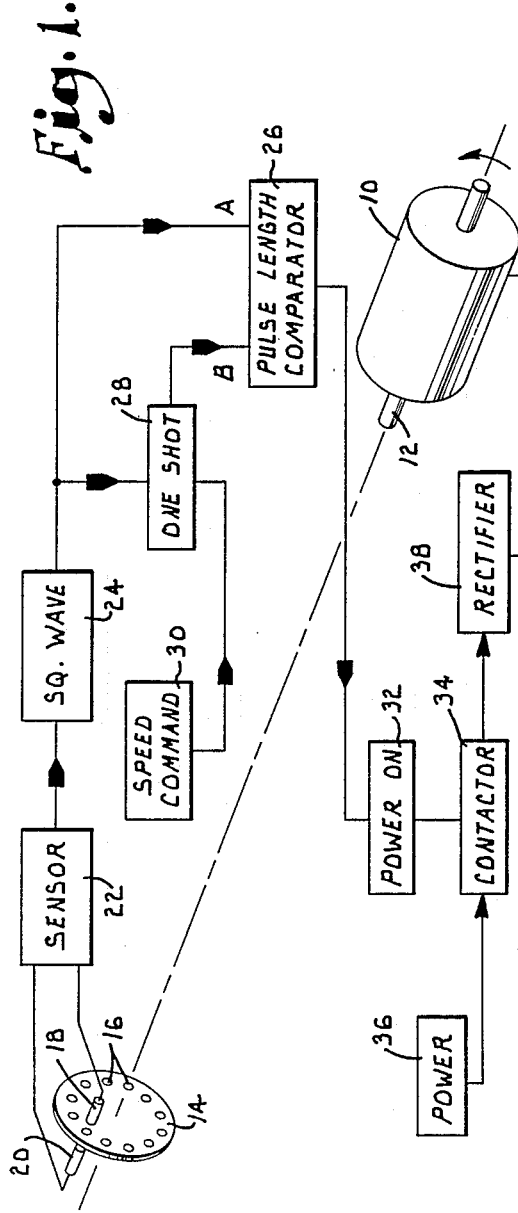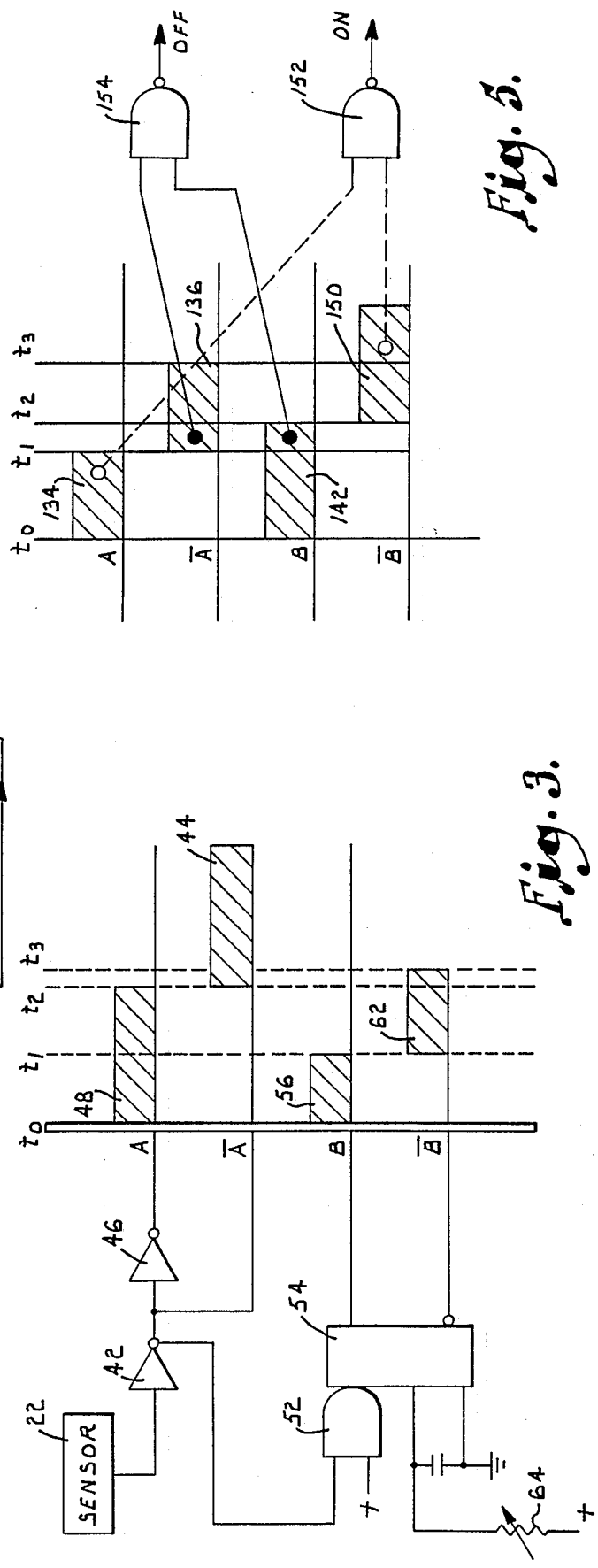

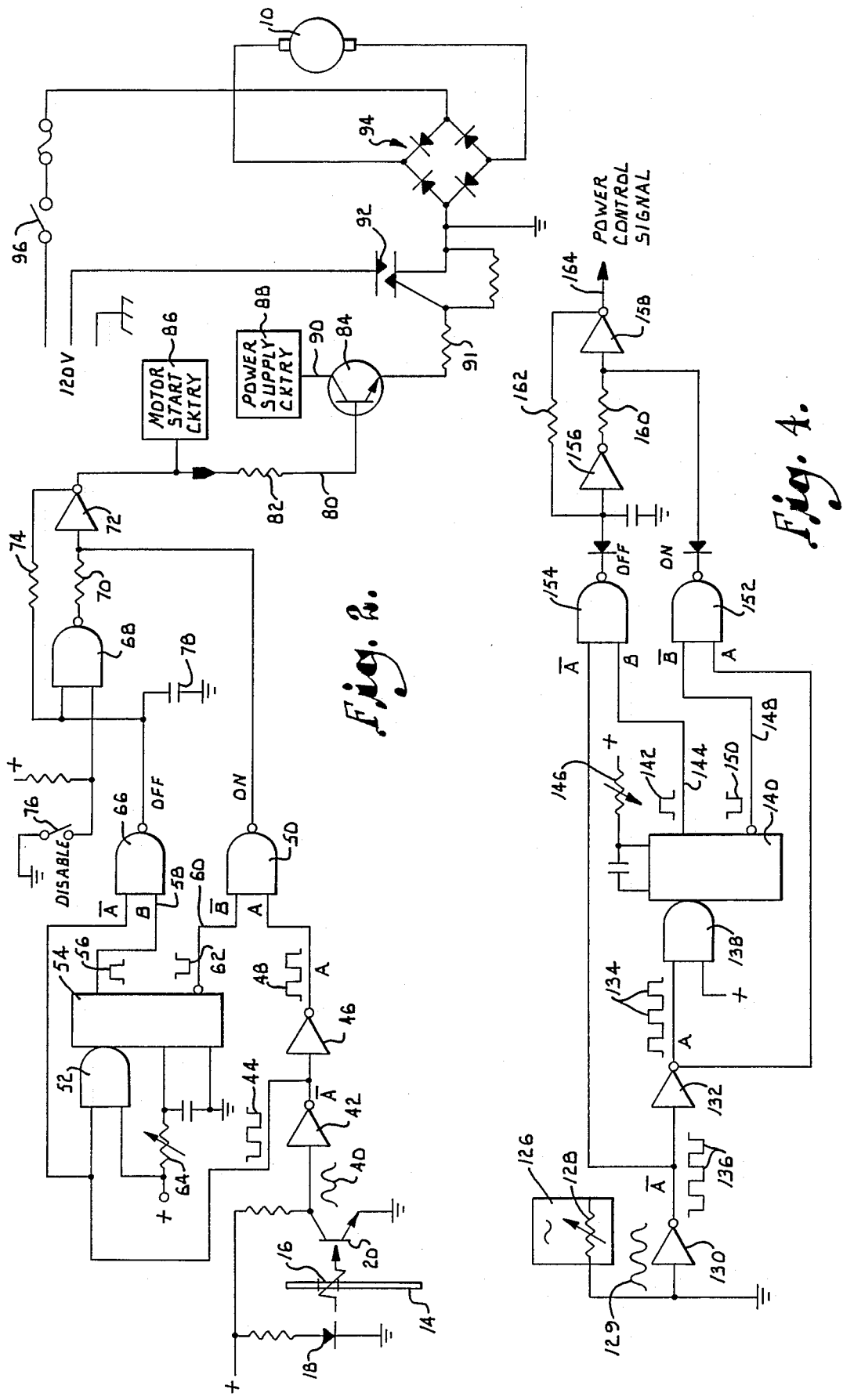

ELECTRONIC CONTROL CIRCUIT FOR COMMAND SYSTEMS

BACKGROUND OF THE INVENTION

This invention relates generally to the control of various types of closed loop systems which receive input commands and execute such commands in order to achieve an output level commanded by the input. More particularly, the invention is directed to an improved control circuit for accurately maintaining the output at the commanded level.

Such command systems have wide application throughout a variety of industries and different technologies. For example, the speed of electric motors is controlled at selected levels in a large number of motor driven machines, including products as diverse as machine tools, wheelchairs and other electrical equipment both large and small. Other examples are heating and/or cooling systems in which a selected temperature is to be maintained, hydraulic and pneumatic control systems, servo-driven machine slides or work station components which control the position of various devices, and chemical and industrial processing facilities in which parameters such as pressure, speed, force, flow rate, temperature, the rate of heat application or extraction, or the proportions involved in mixing operations are controlled.

In all of these systems, an input command is executed in order to achieve a system output which corresponds to the input command. In a motor speed control system, a speed setting dial or other input device is used to select the desired operating speed, and the motor responds to the input command by adjusting its output speed to conform with the speed which is commanded. This type of control system is generally referred to as a closed loop system which uses a feedback signal to control the motor operation in a manner to achieve coincidence of the output speed with the commanded speed. Thermal control systems such as ovens sense the temperature and turn heating elements on and off depending upon whether or not the actual temperature is above or below the selected temperature.

One of the principal problems with all closed loop command systems is that there is a "dead band" within which the actual output can fluctuate without the system responding. Thus, the output can vary from the input command within the dead band range, and the accuracy of the control system suffers accordingly. In addition, the control system typically includes mechanical components which detract from the reliability of the system and are subject to breakdowns and other mechanical malfunctions. Conventional controllers are also subject to a torque reduction when operating at low speeds.

SUMMARY OF THE INVENTION

The present invention is directed to an electronic control circuit which may be used to control virtually any closed loop command system in a reliable manner to achieve an output that precisely tracks the input command without giving rise to any appreciable dead band or other inaccuracy.

In accordance with the invention, the output of the system may be sensed by any suitable device and is converted into a train of square wave pulses each having a duration that is representative of the sensed output. In an electric motor application, the duration of each pulse is inversely proportional to the motor speed. The pulse train that is generated by the sensed output is used to trigger another square wave pulse train in which the pulse duration depends upon the setting of the input command. Consequently, corresponding pulses in the two pulse trains are initiated simultaneously, and the pulse durations can be compared to determine whether the output is above or below the set level. In the case of an electric motor, if the pulses generated by the output are longer than those for the input command, the motor is operating more slowly than commanded and its power level is increased until the command speed is reached.

Preferably, the pulse length comparison is implemented by logic circuitry which generates the logical complement of each pulse. Paired logic gates receive the respective pulses and the complements of the other pulses. If a pulse overlaps in time with the complement of the other pulse, that pulse has the longer duration, and the logic circuitry generates output signals from the gates containing information as to which pulse is longer. The signals are applied to a memory circuit which responds to them and holds the last logic signal it has received. The output from the memory circuit controls a switching transistor used to operate a triac (or another solid state switch) which in turn controls the application of electrical power to the motor. The use of solid state switching controls in combination with CMOS logic circuits is preferred.

It is an important feature of the invention that virtually any type of closed loop command system can be controlled precisely and without any significant dead band or other inaccuracy in the tracking. The circuitry takes advantage of the benefits of digital components and yet can operate with analog input and output signals. The components that are used in the circuit are readily available and are state of the art components which are combined in a simple yet highly effective manner to achieve extreme precision in carrying out the control function of the circuit.

DESCRIPTION OF THE DRAWINGS

In the accompanying drawings which form a part of the specification and are to be read in conjunction therewith and in which like reference numerals are used to indicate like parts in the various views:

FIG. 1 is a functional block diagram of a control circuit used to control the speed of an electric motor according to one embodiment of the present invention;

FIG. 2 is a schematic diagram of the control circuit of FIG. 1;

FIG. 2a is a schematic diagram of the motor start and power up circuits included in the control circuit of FIG. 2;

FIG. 3 is a diagrammatic view showing the timing of the various control signals which are generated by the control circuit of FIG. 2;

FIG. 4 is a schematic diagram of a control circuit used to control a thermal system according to another embodiment of the invention; and FIG. 5 is a diagrammatic view showing the timing of the various control signals generated in the control circuit of FIG. 4.

DETAILED DESCRIPTION OF THE INVENTION

Figure 22:
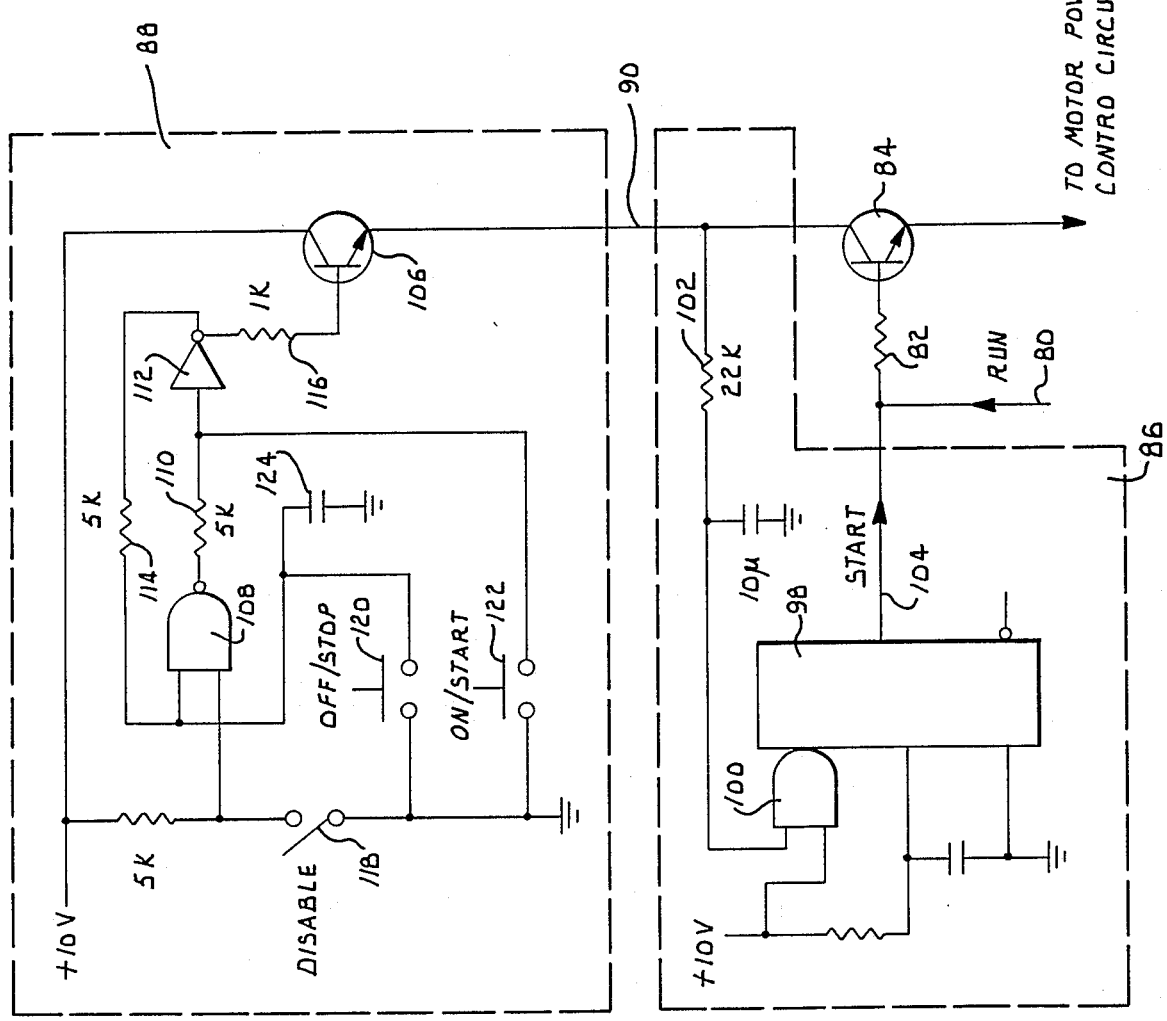

At the outset, it is important to recognize that the control circuit of the present invention can be used to control a wide variety of closed loop systems of the type that conventionally operate by comparing an input command to a resultant output and generate an error signal which is used to correct a mismatch between the commanded output and the actual output. Although the control circuit will be specifically described with implementations involving the speed control of an electric motor and the temperature control of a thermal system, it is to be understood that these applications are for purposes of illustration only and that the circuit is equally useful in the control of other types of closed loop command systems.

With initial reference to FIG. 1, numeral 10 designates a conventional DC electric motor which rotatively drives an output shaft 12. In accordance with the present invention, the rotational speed of the output shaft 12 is sensed and converted into a pulse train representative of the sensed speed. This may be accomplished by using the shaft 12 to turn a disk 14 having a plurality of equally spaced apertures 16 located around its periphery. In a form of the invention that has been implemented, the disk 14 has 45 apertures 16 around its circumference, with the apertures spaced apart from one another in 8° increments. Preferably, the duty cycle is approximately 50%; i.e., the center to center spacing between adjacent apertures is equal to twice the diameter of each aperture.

A photo emitter 18 is located on one side of the disk 14 adjacent its periphery, and a paired photo detector 20 is located on the opposite side of the disk in alignment with the emitter 18. Consequently, each time one of the apertures 16 is located between the emitter 18 and detector 20, the detector 20 senses infra red energy emitted by the emitter and generates a pulse. It is noted that the duration of each pulse is dependent upon the dwell time of the aperture between the emitter and detector, so the pulse duration is inversely proportional to the rotational speed of the motor output shaft 12.

In this manner, the actual output speed of shaft 12 is sensed by a sensor block 22. The sine wave output from the sensor block 22 is squared up by the square wave block 24. The output from the square wave block 24 is a square waveform containing digital pulses A each having a duration equal to the sensed output speed of the motor. This signal is applied to a pulse length comparator block 26 and also to a one shot circuit 28. The one shot circuit receives another signal from a speed command block 30 which is used to set the commanded speed of the motor. The input signals from the square wave block 24 trigger pulses from the one shot circuit 28, and each pulse B from the one shot circuit 28 is applied to the pulse length comparator 26. Because the A pulses are used to trigger the B pulses, the corresponding A and B pulses are initiated at the same time, and their durations are compared in the comparator block 26. The input from the speed command block 30 determines the duration of the B pulses.

If the determination in the comparator block 26 is that the A pulses are shorter than the B pulses, the motor is operating faster than the commanded speed, and there is no active signal to the POWER ON block 32. The POWER ON block is then inactive because there is no call for power. Conversely, if the A pulses are longer than the B pulses, the motor is operating more slowly than commanded, and the POWER ON block 32 is activated to in turn activate the contactor block 34. This permits AC power from the power block 36 to reach a rectifier 38 which in turn applies DC power to the electric motor 10 in order to increase its shaft speed. It is noted that the pulse length comparator 26 compares the pulse length of each corresponding pair of A and B pulses so that the motor condition is updated with each pulse and is substantially continuously controlled in a manner to conform its output speed with the commanded input speed.

Referring now to the schematic diagram of FIG. 2, the emitter 18 may take the form of a diode 18 which emits infrared light. The photo detector 20 may take the form of a photo transistor which is turned on and off by the pulses of infra red energy which reach it through the apertures 16. The result of this arrangement is that the output from the speed sensor takes the form of a sine wave 40 which is applied to a Schmitt trigger inverter 42. The Schmitt trigger action of the inverter 42 inverts and squares the sine wave 40 to produce an inverted square wave form containing a series of inverted digital pulses 44. Pulses 44 are applied to another Schmitt trigger inverter 46 which produces a series of digital pulses 48 which are the A pulses previously mentioned. The A pulses 48 are applied as one input to a NAND gate 50. As previously mentioned, the pulse trains preferably have a 50% duty cycle such that the pulse length is equal to the time between pulses.

The $\overline{A}$ pulses 44 are the logical complements of the pulses 48. The $\overline{A}$ pulses are applied as one input to an AND gate 52 which triggers a one shot circuit 54. The second input to gate 52 is held constantly high. Each time the one shot circuit 54 is triggered by gate 52, it emits a high digital pulse 56 on its output line 58. Pulses 56 are the B pulses previously mentioned. It is noted that the one shot circuit 54 is connected such that B pulses are triggered by the trailing edge of each $\overline{A}$ pulse which is coincident with the leading edge of the A pulse to assure that corresponding pairs of A and B pulses are initiated simultaneously.

The one shot circuit 54 has a second output line 60 which carries $\overline{B}$ pulses 62 that are the logical complements of the B pulses. The input speed commands are applied to the one shot circuit 54 by a dial or other mechanism which is used to adjust the setting of a potentiometer 64. The signal that is applied to the one shot circuit by the input command potentiometer 64 determines the duration of each B pulse 56. The relationship is inverse in that the higher the input speed command setting of the potentiometer, the shorter the duration of each pulse 56. It should be noted that other techniques can be used instead of a potentiometer to acquire a shift in pulse duration to develop a pulse command value. Thus the invention can use other known techniques for varying the pulse length from a triggerable one shot circuit. These can be voltage, current, or resistive or capacitor, or inductor change techniques to command the timing of the pulse generator for the B pulse system.

The pulse length comparator circuitry includes the NAND gate 50 and a paired NAND gate 66. Gate 50 receives as its inputs the A and $\overline{B}$ pulses, while the other NAND gate 66 receives as its inputs the $\overline{A}$ and B pulses. Gates 50 and 66 provide an error signal which is used to adjust the motor speed. Gate 50 provides a signal which turns the motor on to increase its power level, while gate 66 provides a signal which turns the motor off to reduce its operating power level.

The output signals from gates 50 and 66 are applied to a memory circuit formed by a NAND gate 68, a resistor 70, an inverter 72 and a feedback resistor 74. Gate 68 is connected as an inverter which receives the output from gate 66 on one of its inputs and is provided with a continuously high signal on its other input so long as a disable switch 76 remains open. When the disable switch 76 is closed, one input of gate 68 is pulled continuously low. Since the output from gate 68 is applied to the inverter 72, the inverter then provides a continuously low output. The output from gate 50 connects between resistor 70 and the input to inverter 72. The memory circuit is essentially a flip flop which holds on the output of inverter 72 the last signal applied from one of the gates 50 or 66. A capacitor 78 allows the system to be off at power up.

The output from the memory circuit is applied to line 80 and through resistor 82 to the base of a transistor 84. A motor start circuit 86 which will subsequently be described also preferably connects with line 80. Power is normally made available to transistor 84 through a power supply circuit 88 which connects via line 90 with the collector of transistor 84. The emitter of transistor 84 connects through resistor 91 with the gate terminal of a Triac 92 which connects on one side with an AC power line and on the other side with a full wave bridge rectifier 94. The other AC line connects through an on/off switch 96 with the opposite side of the bridge rectifier 94. The rectified output from the bridge circuit is applied to the DC motor 10.

The motor start circuit 86 is shown in FIG. 2a and provides a start signal to transistor 84 upon start up, since at this time the disk 14 is not in rotation. The start circuit includes a gate triggered one shot circuit 98 controlled by an AND gate 100. One input to gate 100 is connected with line 90 through a resistor 102, and the other input is held continuously high. The one shot circuit 98 has an output line 104 which connects with the base of transistor 84 through resistor 82 and which receives a start pulse when line 90 is driven to a high state. The start pulse on line 104 makes transistor 84 conductive so that power is available to the Triac 92 for energizing motor 10.

With continued reference to FIG. 2a, the power supply circuit 88 includes a power up switching transistor 106 which controls the connection between the power supply and line 90. Transistor 106 is in turn controlled by flip flop circuitry which includes a NAND gate 108 connected as an inverter, a resistor 110, an inverter 112 and a feedback resistor 114. The output side of inverter 112 connects with the base of transistor 106 through a resistor 116. So long as a disable switch 118 is open, one input to gate 108 is continuously high. The other input to gate 108 is a feedback signal applied through resistor 114 from the output of inverter 112. However, the second input to gate 108 is connected with ground through a normally open off/stop push button switch 120. Connected between ground and the input to inverter 112 is a normally open on/start push button switch 122. A capacitor 124 provides power off upon restart or after a power outage.

Momentary depression of the on/start switch 122 pulls the input to inverter 112 low, thus providing a high signal to both gate 108 and the power up transistor 106. The high signal applied to gate 108 maintains the input to inverter 112 low even after switch 122 is released. Consequently, transistor 106 is maintained in a conductive state such that power is made available through the transistor and line 90 to the motor start circuit and transistor 84. When the off/stop switch 120 is momentarily depressed, the low signal which is applied to gate 108 causes the output of inverter 112 to go low, thus turning off transistor 106 and removing power from the motor control circuitry until such time as the on/start switch 122 is depressed again.

In operation of the control circuit shown in FIGS. 1 and 2, the sine wave 40 which is representative of the motor speed is converted into $\overline{A}$ and A pulses by inverters 42 and 46. The $\overline{A}$ pulses trigger the B pulses so that the A and B pulses are initiated simultaneously. The gates 50 and 66 provide a comparison of the duration of pulses A and B in order to determine which pulse is longer.

The timing diagram of FIG. 3 diagrammatically illustrates a situation where the A pulse is longer than the B pulse. This means that the actual motor speed is slower than the commanded speed so that the power level of the motor should be increased to bring the actual speed up to the commanded speed. As shown in FIG. 3, the shorter duration of the B pulse 56 results in the A pulse 48 and the $\overline{B}$ pulse 62 being high simultaneously during the time interval $t_1$-$t_3$. Consequently, the output from gate 50 is driven low during this time interval, and inverter 72 applies a high signal to the base of transistor 84, thus making the transistor conductive, turning on the Triac 92 and energizing motor 10 through the bridge rectifier 94 to increment the power level of the motor. The motor remains energized so long as the A pulse is longer than the B pulse, and the motor speed increases in order to shorten the A pulse until it eventually has a shorter duration than the B pulse.

When the B pulse 56 is longer than the A pulse 48, there will be a time period when the B pulse 56 and the $\overline{A}$ pulse 44 are high at the same time. Then, gate 66 provides a low output signal which drives transistor 84 to the non-conductive state so that the motor 10 is deenergized and its power level is decremented. Again, this condition remains until the motor has slowed sufficiently that the A pulse is longer than the B pulse, at which time the motor is operating too slowly and is again energized to bring it up to the commanded speed.

It is noted that the control circuit compares the duration of each A and B pulse, so the comparison is updated frequently. Assuming that the commanded motor speed is 500 revolutions per minute and there are 45 pulses per revolution developed by the feedback disk 14, the control circuit will compare 22,500 pulses per minute or 375 pulses per second. As a result, the motor speed is adjusted on a substantially continuous basis so that the actual output speed accurately tracks the selected speed which is commanded. There is no significant "dead band" or other built in inaccuracy in the ability of the system to achieve an output speed which precisely and substantially continuously tracks the commanded speed. The output from the flip flop memory circuit increments or decrements the power level of the motor so that it "catches up" or "slows down" to the commanded speed. The electronics "updates" with each pulse and does not average the pulses.

The control circuit of the present invention can also be used to control a thermal system which functions to maintain a selected temperature level. In the implementation shown in FIG. 4, an oscillator 126 is controlled by a thermistor 128 such that the sine wave output 129 from the oscillator has a frequency which depends upon the resistance presented by the thermistor. The thermistor 128 is located in the area which is being controlled as to its temperature, and the resistance of the thermistor changes with temperature changes in the area. In the embodiment of the invention which is illustrated, the duration of each sine wave pulse generated by the oscillator 126 is inversely proportional to the temperature which is sensed by the thermistor 128. However, the relationship may be directly proportional if another type of thermistor is used.

The sine wave pulses 129 from the oscillator 126 are inverted by a Schmitt trigger inverter 130 and again by another Schmitt trigger inverter 132. The square wave output from inverter 132 includes the A pulses 134 each having a duration depending upon the sensed temperature in the area that is being controlled. The output pulses from the first inverter 130 are the $\overline{A}$ pulses 136 which correspond to the A pulses 134 but are the logical complements of the A pulses.

The output from inverter 132 is applied to one input of an AND gate 138 which triggers a one shot circuit 140. The second input to gate 138 is held continuously high, so the leading edge of each pulse 134 triggers the one shot circuit 140 which then generates a B pulse 142 on output line 144. The duration of each B pulse 142 is determined by the setting of a potentiometer 146 which provides the input command which selects the temperature that is to be maintained. Again, there is an inverse relationship in that higher commanded temperatures result in shorter durations for the B pulses. The second output line 148 of the one shot circuit 140 carries $\overline{B}$ pulses 150 which are the logical complements of the corresponding B pulses 142.

A NAND gate 152 receives the A pulses 134 and the $\overline{B}$ pulses 150 on its two inputs. A second NAND gate 154 receives on its inputs the $\overline{A}$ pulses 136 and the B pulses 142. The output lines from the NAND gates 152 and 154 connect with a memory flip flop circuit which includes a pair of inverters 156 and 158, a resistor 160 between the inverters and a feedback resistor 162 which connects between the output of inverter 158 and the input of inverter 156. The output from gate 154 connects with the input to inverter 156, while the output from gate 152 connects between resistor 160 and inverter 158. The output line 164 of inverter 158 carries a power control signal which may be used to suitably control the system which heats the area under control. For example, electric heating elements (not shown) may be energized when line 164 is active (high) and deenergized when line 164 is inactive. Consequently, the temperature in the area under control is increased in the active condition of the power control line 164 and is decreased in the inactive condition of line 164.

In operation of the control circuit shown in FIG. 4, the sine wave pulses 129 from the oscillator 126 have durations determined by the temperature sensed by the thermistor 128, and the duration of each A pulse 134 is inversely proportional to the sensed temperature in the illustrated circuit. The leading edge of each A pulse 134 triggers a corresponding B pulse 142, the duration of which is inversely proportional to the command temperature which is set by the potentiometer 146. The NAND gates 152 and 154 form a pulse length comparator arrangement. As shown diagrammatically in FIG. 5, if an A pulse 134 has a shorter duration than the corresponding B pulse 142, the actual temperature in the area under control is greater than the commanded temperature. The B pulse 142 and the $\overline{A}$ pulse 132 will be present high simultaneously during the time interval $t_1-t_2$, and gate 154 provides a low output signal during this time interval. Consequently, the power line 164 is held low, and the heating elements or other system driven components are deenergized to allow the temperature level to fall to the commanded temperature. Under these conditions, the A and $\overline{B}$ pulses 134 and 150 are high only at different times, and gate 152 holds its output line high. Due to the arrangement of the memory circuit, the power control line 164 remains in the same condition until a different input signal is applied to the memory circuit. Consequently, the power control line 164 remains in a low state until the durations of the A pulses 134 exceed the corresponding B pulses 142.

When the temperature level in the area under control drops below the commanded temperature, the duration of the next A pulse 134 exceeds the duration of the corresponding B pulse 142. Then, the A pulse 134 overlaps with the $\overline{B}$ pulse 150, and gate 152 has two high inputs, generating a low output which is applied to inverter 158. The power control line 164 is then driven high to activate the heating elements in order to raise the temperature level back up to the commanded temperature.

In this manner, a comparison of the actual and commanded temperatures is made with each oscillator pulse, and the system is updated with each pulse to assure that the actual temperature closely and substantially continuously tracks the commanded temperature. Any "dead band" that exists results from the action of the heating elements or other system components rather than the control circuit.

In addition to the command systems specifically described herein, it should be understood that the control circuit of the present invention may be applied to other drive systems as well as various types of closed loop command systems. For example, the control circuit can be used to maintain the setting of various types of industrial power applications including process control systems, machine tools, hoists, elevators, conveyors, door and valve actuators, other power motion devices driven by electrical equipment, and systems which employ electrical servo or control power systems having mechanical, pneumatic, hydraulic or other prime movers. The control circuit is applicable to both large and small motor applications, including small fractional horsepower drive systems included in toys, hand tools, small appliances, hobby and craft equipment, fans, blowers and other electromechanical devices. Large gasoline engines, steam turbines and other large equipment can also be controlled by substantially the same control circuitry as is used to control smaller equipment.

The memory function of the circuit can be performed by various types of flip flop systems as alternatives to the simple inverter system with the feedback resistor. The illustrated memory circuit is a complete yet simple system with straight forward and forgiving circuitry and makes economical use of existing gates from standard commercial packages to achieve good performance and provide advantageous features for the illustrated circuit configuration.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A digital speed control circuit for an electric motor having a rotary output shaft, said circuit comprising:

means for sensing the rotational speed of the output shaft and converting the sensed speed into a first digital pulse having a duration inversely proportional to the shaft speed;

means for receiving an input speed command representative of the commanded speed at which the shaft is to rotate;

means for using said first digital pulse to trigger a second digital pulse initiated simultaneously with the first pulse and having a duration inversely proportional to the commanded speed;

means for generating a first digital control signal whenever the duration of the first pulse exceeds the duration of the second pulse and a second digital control signal whenever the duration of the second pulse exceeds the duration of the first pulse, said first and second digital control signals being logical complements of one another;

a digital control circuit for controlling the application of power to the motor, said digital control circuit having a first state in which full power is applied to the motor for energization of same and a second state in which no power is applied to the motor for deenergization of same; and switching means controlled by said first and second digital control signals for effecting the first state of said digital control circuit immediately upon generation of said first digital control signal and for effecting the second state of said digital control circuit immediately upon generation of said second digital control signal, thereby maintaining correspondence between the sensed speed and the commanded speed without a dead band range in which the sensed speed can fluctuate without being changed.

2. The circuit of claim 1, including:

a motor start circuit for starting the motor from rest, said start circuit being connected with said switching means; and a start switch in said motor start circuit, selectively operable to effect generation of said first digital control signal irrespective of the relative durations of said first and second pulses, whereby the motor can be started from a rest state in which said first digital pulse is absent.

3. A speed control circuit for an electric motor driving a rotary output shaft, said circuit comprising:

means for sensing the rotational speed of the output shaft and converting the sensed speed into a first digital pulse having a duration inversely proportional to the shaft speed;

means for receiving an input speed command representative of the commanded speed at which the shaft is to rotate;

means for using said first digital pulse to trigger a second digital pulse initiated simultaneously with the first pulse and having a duration inversely proportional to the commanded speed;

means for generating the logical complement of said first pulse;

means for generating the logical complement of said second pulse;

a first logic gate receiving the first pulse and the logical complement of said second pulse, said first logic gate providing an output signal when the first pulse has a shorter duration than the second pulse;

a second logic gate receiving the second pulse and the logical complement of said first pulse, said second logic gate providing an output signal when the second pulse has a shorter duration than the first pulse;

a memory circuit connected to receive the output signals from said first and second gates, said memory circuit having an output line maintained in a first state when the output signal from the first gate is the last signal received and in a second state when the output signal from the second gate is the last signal received;

a digital motor control circuit connected with and controlled by said output line of the memory circuit, said motor control circuit applying full power to the motor for full energization thereof when said memory circuit output line is in the first state thereof and preventing application of power to the motor for full deenergization thereof when said memory circuit output line is in the second state thereof; and a motor start circuit for starting the motor from a rest condition, said motor start circuit being connected with said memory circuit output line and including a start switch selectively operable to effect said first state of the memory circuit output line in a manner to override the control thereof normal exercised by the output signals from said first and second gates.

* * * * *